United States Patent Office 3,301,679 Patented Jan. 31, 1967

3,301,679

TWO-COMPONENT DIAZOTYPE LIGHT-SENSITIVE PHOTOPRINTING MATERIAL SUSCEPTIBLE TO THERMAL DEVELOPMENT

Bernard I. Halperin, Glen Aubrey, John Joseph McKinney, Binghamton, and Robert I. Eldred, Jr., Endicott, N.Y., assignors to General Aniline & Film Corporation, New York, N.Y., a corporation of Delaware No Drawing. Filed July 1, 1963, Ser. No. 292,097
8 Claims. (Cl. 96—75)

This invention relates to light-sensitive two-component diazotype photoprinting material susceptible to development by heating, and to a process of preparing and using such materials in the preparation of photocopies.

Two-component diazotype photoprinting material has, on a supporting surface, generally a supporting sheet of paper, film or the like, a light-sensitive coating or layer containing an azo coupling component, a stabilized light-sensitive diazonium compound, and an acid stabilizer to prevent premature coupling of the aforesaid components. The sensitized coating or layer, so constituted, is adapted on treatment with an alkaline developing medium to couple, forming an azo dyestuff coloration. After exposure of the light-sensitive layer to actinic light under an opaque pattern on a translucent background, the light-senstive diazonium compound is decomposed in the light-struck areas, and when the material is thereafter subjected to a neutralizing alkaline treatment, the acid stabilizer is neutralized and the residual diazonium compound in the areas corresponding to the opaque image couples with the azo coupling component to form an azo dye image of the original pattern.

It has been proposed heretofore to prepare diazotype photoprinting materials susceptible to development by heat. Thus, in United States Patents 2,178,771 and 2,205,991, processes are disclosed in which reagents adapted to provide alkali on exposure to heat and moisture are applied in dry powdered form to the surface of two-component diazotype materials. After exposure to light under an opaque pattern, development of the image is effected by exposure of the material to heat and moisture. United States Patents 2,228,562, 2,681,277, 2,732,299 and 2,774,669, inter alia, disclosed two-component diazotype photoprinting materials including nitrogen compounds, e.g., urea derivatives, which, on heating, decompose to form ammonia or a nitrogenous base, causing coupling of the two-component diazotype system. The aforesaid materials, however, have the disadvantage that the light-sensitive layers or alkali-yielding components are relatively unstable, especially when exposed to atmospheric moisture, resulting in poor stability to deterioration when stored.

In copending application Serial No. 292,066 of Bernard I. Halperin, entitled, "Diazotype Photoprinting Material Susceptible to Thermal Development," it was attempted to overcome the aforesaid deficiencies by incoporating the light-sensitive diazonium compound and a compound adapted on heating to liberate alkaline reacting material respectively in superposed successively applied and successively dried aqueous latex coatings, the azo coupling component being contained in either coating, but preferably in the same coating as the alkali liberating compound. While improved stability resulted, the color density of the images was lowered because of decomposition of the diazonium compound occurring concurrently with its coupling reaction during heat development.

It is an object of this invention to provide an improved two-component diazotype photoprinting material susceptible to heat development, yielding not only satisfactory stability to storage on conditions of high temperature and high humidity, but also yielding a high color density in the image regions on development by heat.

We have found that the foregoing objects can be accomplished by including polyvinyl alcohol together with the light-sensitive diazonium compound, preferably with some or all of the other components of the sensitizing composition, in an aqueous sensitizing solution applied to the supporting surface or sheet, yielding on drying a light-sensitive layer or film of polyvinyl alcohol containing the diazonium compound. The components not included in the polyvinyl alcohol-diazonium compound solution applied to the support, can be applied if desired in a separate coating, beneath or above the polyvinyl alcohol-diazonium compound layer. However, all of the components are preferably applied in the same coating.

The resulting material is characterized by enhanced stability in storage, and yields on heat development, an image of increased color density as compared with the material of application Serial No. 292,066 referred to above. In addition, the background of developed prints made therewith has increased stability to yellowing. It was found, namely, that polyvinyl alcohol exerts a protective action upon the light-sensitive diazonium compound, inhibiting its decomposition through contact with the alkali generating reagents during storage, retarding its decomposition during heat development, and inhibiting yellowing of the background areas after development. The polyvinyl alcohol employed in accordance with this invention should have at least 70% of the ester groups of the precursor polyvinyl acetate (or other polyvinyl ester hydrolyzed) and should have a viscosity ranging from 2 to 15 centipoises at 20° C. based on a 4% aqueous solution. Preferably low viscosity grade polyvinyl alcohol of which a 4% aqueous solution has a viscosity ranging from 2 to 5 centipoises at 20° C. is used.

The quantity of polyvinyl alcohol should at least equal the quantity of light-sensitive diazonium salt with which it is associated. Quantities of polyvinyl alcohol ranging from 3 to 10 times the quantity of diazonium compound are especially satisfactory. The presence of larger amounts of polyvinyl alcohol is not critical, suitable proportions being determined primarily by the maintenance of a viscosity convenient for coating operations. Suitable proportions of polyvinyl alcohol include up to about thirty times the quantity of light-sensitive diazonium compound.

The concentration of polyvinyl alcohol in the sensitizing solution is a matter of convenience, being selected to provide a viscosity suitable for the coating operation in which the solution is employed. In general with polyvinyl alcohol having a low viscosity within the range indicated above, concentrations of the order of 20% can be used; while somewhat lower concentrations are appropriate for polyvinyl alcohol having higher viscosity characteristics within the aforesaid range.

The aqueous polyvinyl alcohol solution employed as a vehicle for the light-sensitive diazonium compound may include additional components hitherto incorporated in diazotype sensitizing solutions. These include finely divided or colloidal silica or alumina, as well as aqueous latex dispersions or emulsions of water-insoluble organic film-forming resins. These include aqueous lattices of polyvinyl acetate, polymethylmethacrylate, polyacrylonitrile, polyvinyl chloride, polyvinyl chlorideacetate and polyvinylidine chloride, or mixtures, combination or copolymers of the foregoing. However, when latex emulsions or dispersions of this type are employed, in addition to polyvinyl alcohol in the same coating solution, the quantity of dispersed resin should not exceed two-thirds of the quantity of polyvinyl alcohol.

Light-sensitive stabilized diazonium compounds which can be employed in preparing the diazotype photoprinting material of this invention include the compounds listed in United States Patent 2,501,874 and in the article by Van der Grinten in the Photographic Journal, volume 92–B (1952), page 46. They comprise especially diazonium compounds derived from N-mono- and N-di-substituted p-phenylenediamines, e.g. the diazotization products of N-ethyl-N-beta-hydroxyethyl-p-phenylenediamine
N,N-diethyl-p-phenylenediamine
N-benzyl-N-ethyl-p-phenylenediamine
N-ethyl-p-phenylenediamine
N,N-diethyl-2-ethoxy-p-phenylenediamine
N-ethyl-2-methyl-p-phenylenediamine
N,N-bis-hydroxyethyl-p-phenylenediamine
N-beta-hydroxyethyl-N-methyl-p-phenylenediamine These diazonium compounds are preferably stabilized in the form of their double salts with the zinc chloride, tin chloride, cadmium chloride and the like.

Azo coupling components which can be included in the photoprinting material of the invention are, for example:

2,3-dihydroxynaphthalene
1,8-dihydroxynaphthalene
Resorcinol
Octylresorcinol
Alpha-resorcylamide
3-methyl-1-phenyl-5-pyrazolone
H-acid
2,3-dihydroxynaphthalene-6-sulfonic acid
2,5-xylenol
4,4′-diresorcyl sulfide
2-methyl resorcinol In order to provide an acid medium adapted to stabilize the diazonium compound and azo coupling component against premature coupling, acids such as citric acid, tartaric acid, and similar acid reacting materials can be included.

Reagents employed in accordance with the invention which are adapted to yield an alkali for neutralizing the acid stabilizers so as to promote coupling when subjected to heat may be selected from compounds having a neutral or acid reaction at room temperature, but which when exposed to heat, especially at temperatures from 100 to 200° C. (and preferably from 120 to 160° C.), undergo modification or decomposition giving rise to an alkaline compound. Reagents of this kind include the monoalkali metal, e.g., sodium and potassium, and nitrogen base salts of strong organic acids adapted to decompose on heating to yield a basic compound, e.g., salts of malonic, oxalic or maleic acid. In particular, the sodium, potassium and nitrogen base salts of trichloroacetic acid are suitable.

The aforesaid alkali generating reagents are employed in such amounts that upon heat conversion to an alkaline compound during thermal development, a sufficient amount thereof is present to neutralize the acid stabilizer and thereby promote coupling of the diazonium compound and the azo coupling component.

All of the ingredients of the sensitizing compositions can be incorporated in the same sensitizing solution and layer, so that sensitization of a support can be effected by a single coating operation. Alternatively, the diazonium compound can be incorporated in a coating solution containing the polyvinyl alcohol, while the heat-sensitive alkali-generating reagent is incorporated in a separately applied coating solution, the azo coupling component being incorporated in either of the two solutions. It is advantageous in such case to include a film-forming binder in the latter solution. Such a binder or vehicle can be polyvinyl alcohol as employed in the diazonium containing solution or it may be a latex dispersion of an organic film-forming polymer such as polyvinyl acetate, polyvinyl chloride, polyvinyl chloride-acetate, polyvinylidene chloride or polymethylmethacrylate. Instead of these, water-soluble colloids such as gelatine, methyl or ethyl cellulose, hydroxyethyl cellulose or the like can also be used.

Other components commonly employed in two-component diazotype sensitizing composition can be included in the sensitizing solution and layers of this invention. Thus, there can be added hygroscopic agents such as glycol or glycerin, and wetting agents such as saponin, lauryl sulfate, keryl benzene sulfonate or oleyl N-methyltaurine can be included in a portion of the coating compositions applied to the support.

Diazotype photoprinting material coated with the compositions of this invention, when exposed to actinic light under an original having an opaque pattern on a translucent background so as to effect decomposition of the diazonium compound in the light-struck areas, yield an azo dye image of the original pattern upon heating to temperatures from 100 to 200° C. or preferably from 120 to 160° C., at which the alkali-generating reagent is rendered effective to neutralize the acid stabilizer and cause coupling of the residual diazonium compound in the image areas with the azo coupling component. If the diazonium compound is contained in a separate layer from the alkali-generating reagent, the polyvinyl alcohol facilitates coupling of the components of the layers during heat development so that coupling readily occurs in the image areas.

The following examples wherein parts and percentages are by weight unless otherwise indicated illustrates the process and compositions and materials of the invention:

*Example I*

A diazotype sensitizing solution was prepared having the following composition:

| | |
|---|---|
| Water ______ml__ | 60 |
| Citric acid ______gr__ | 0.5 |
| N - ethyl - N - 2 - hydroxyethyl - p - aminobenzene-diazonium chlorozincate ______gr__ | 0.56 |
| 2,3-dihydroxynaphthalene-6-sodiumsulfonate __gr__ | 3 |
| Polyvinyl alcohol (low viscosity fully hydrolyzed grade, having in 4% aqueous solution a viscosity of 2.2 centipoises at 20° C., e.g., "Shawinigan RS–4326") ______gr__ | 5 |
| Sodium trichloroacetate ______gr__ | 4 |
| Aqueous polyvinylacetate emulsion containing 60% solids, average particle size 1 micron ____ml__ | 5 |
| Finely-divided silica (average particle size 3 to 6 microns) ______gr__ | 4 |
| Water to 100 ml. | |

The resulting solution was coated on paper and allowed to dry. After exposure to light under an original having a relatively opaque pattern on a translucent background, development was effected by heating briefly to about 160° C. The sodium trichloroacetate decomposes on heating to form mainly $CHCl_3$ and sodium bicarbonate which, in the presence of moisture contained in the coating, neutralizes the citric acid serving as an acid stabilizer, and causes coupling of the residual diazonium compound and azo coupling component in the areas protected from light by the opaque pattern of the original. An intense blue image is formed corresponding to the pattern of the original.

*Example II*

A sheet of paper was coated with an aqueous solution having the following composition:

| | |
|---|---|
| 20% aqueous solution of polyvinyl alcohol (similar to that used in Example I) ______ml__ | 25 |
| Citric acid ______gr__ | 0.5 |
| N - ethyl - N - 2 - hydroxyethyl - p - aminobenzene-diazonium chlorozincate ______gr__ | 1.5 |
| Finely-divided silica (average particle size 3 to 6 microns) ______gr__ | 4 |
| Water to 100 ml. | |

After drying, the following solution was coated over the initial coating:

| | |
|---|---|
| Aqueous polyvinyl acetate emulsion (similar to that of Example I) ml | 25 |
| 2,3-dihydroxynaphthalene-6-sodiumsulfonate gr | 3 |
| Sodium trichloroacetate gr | 3 |
| Water to 100 ml. | |

After drying, the paper was exposed as in the preceding example, and developed by heating briefly to 175° C. A blue image having excellent color density was obtained, similar to that produced in Example I.

*Example III*

Paper was coated with a solution having the following composition:

| | |
|---|---|
| 20% aqueous solution of polyvinyl alcohol (similar to that used in Example I) ml | 25 |
| Citric acid gr | 0.5 |
| N-ethyl-N-2-hydroxyethyl-p-aminobenzene-diazonium chlorozincate gr | 1.5 |
| Finely-divided silica (average particle size 1 micron) gr | 4 |
| Water to 100 ml. | |

After drying, the following solution was applied as a coating over the first coat:

| | |
|---|---|
| Aqueous polyvinyl acetate emulsion (similar to that of Example I) ml | 25 |
| 2,3-dihydroxynaphthalene-6-sodiumsulfonate gr | 2 |
| 4,4-p-diresorcylsulfide gr | 0.75 |
| Sodium trichloroacetate gr | 3 |

Upon drying, the resulting diazotype photoprinting material was exposed as described in the preceding examples and developed by heating briefly to 175° C. A black line image of excellent density is obtained, similar to that in the other examples.

In the foregoing examples, low viscosity polyvinyl aclohol can be replaced by other polyvinyl alcohols in which the hydrolysis of the precursor polyvinyl acetate is at least 70%, and in which the viscosity characteristics may be somewhat higher such as to yield in 4% aqueous solution a viscosity up to 15 centipoises at 20° C. Polyvinyl alcohol can also be substituted for the polyvinyl acetate emulsion employed in the examples, similar results being obtained. The polyvinyl acetate emulsion of the examples can be replaced by other aqueous latex dispersions or emulsions of the film-forming water-insoluble polymers such as polyacrylonitrile, polyvinyl chloride, polyvinyl chlorideacetate, or polyvinylidenechloride. Alternatively, the polyvinyl acetate emulsion can be replaced by other film-forming colloids such as polyvinyl methylether-maleic acid copolymer, methyl or ethyl cellulose or hydroxyethyl cellulose or gelatine.

The sodium trichloroacetate of the examples can be replaced by the potassium, ammonium or other nitrogen base salts of trichloroacetic acids or by other reagents converted or decomposed on heating at temperatures about 100 to 200° C. to yield alkaline reacting compounds capable of neutralizing the acid stabilizer so as to cause coupling of the diazonium compound with the azo coupling component. Such compounds are, for example, those enumerated in the discussion preceding the examples.

Instead of paper used as a support in the examples, other supports, generally in the form of sheet, can be used, e.g., heat stable films, e.g., polyethylene terephthalate (Mylar), plastics, as well as fabrics, which may be impregnated, if desired, with appropriate sizing compositions in order to limit their absorbtive character.

Other coupling components and light-sensitive diazonium salts can be substituted for the materials employed in the examples.

Variations and modifications which will be obvious to those skilled in the art can be made in the foregoing processes and compositions without departing from the scope or spirit of the invention.

We claim:

1. Two-component diazotype photoprinting material susceptible to development by heating, having on a surface of a supporting sheet, an azo coupling component, a light-sensitive diazonium compound, an acid stabilizer to prevent premature coupling, an acid to neutral reagent which is converted on heating at a temperature from 100 to 200° C. to an alkaline reacting compound, and polyvinyl alcohol at least 70% unesterified having such viscosity characteristics as to provide in 4% aqueous solution at 20° C. a viscosity of 2 to 15 centipoises, said polyvinyl alcohol and said diazonium compound being combined in a single layer in such proportions that the amount of polyvinyl alcohol equals at least the amount of said diazonium compound.

2. Photoprinting material as defined in claim 1 wherein all of the components on the surface of said support are combined with said polyvinyl alcohol in a single layer.

3. Photoprinting material as defined in claim 1 wherein said polyvinyl alcohol has viscosity characteristics such as to provide in 4% aqueous solution at 20° C. a viscosity of 2 to 5 centipoises.

4. Photoprinting material as defined in claim 1 wherein the polyvinyl alcohol layer contains, in addition, a dispersed water-insoluble, film-forming organic polymer amounting to not more than two-thirds of the weight of the polyvinyl alcohol.

5. Photoprinting material as defined in claim 1 wherein the light-sensitive diazonium compound is contained in one layer and said acid to neutral reagent is contained in a separate but contiguous layer containing an organic film-forming polymer.

6. Photoprinting material as defined in claim 5 wherein said polymer in the last-named layer is a dried latex dispersion of a water-insoluble film-forming organic polymer.

7. Photoprinting material as defined in claim 5 wherein said polymer in the last-named layer is polyvinyl alcohol having such viscosity characteristics as to provide in 4% aqueous solution at 20° C. a viscosity of 2 to 5 centipoises.

8. Photoprinting material as defined in claim 1 wherein the said acid to neutral reagent is selected from the class consisting of the alkali metal, ammonium and nitrogen base salts of trichloroacetic acid.

References Cited by the Examiner

UNITED STATES PATENTS

| | | | |
|---|---|---|---|
| 2,653,091 | 9/1953 | Grieg | 96—49 |
| 2,807,545 | 9/1957 | Frederick | 96—91 X |

FOREIGN PATENTS

| | | |
|---|---|---|
| 1,249,913 | 11/1960 | France. |
| 1,255,950 | 2/1961 | France. |

OTHER REFERENCES

Kosar, "Photographic Science & Engineering," vol. 5, No. 4, July–August 1961, pages 239–243.

NORMAN G. TORCHIN, *Primary Examiner.*

R. L. STONE, A. D. RICCI, *Assistant Examiners.*